US006987845B1

(12) United States Patent
Van Natter et al.

(10) Patent No.: US 6,987,845 B1
(45) Date of Patent: Jan. 17, 2006

(54) METHODS, SYSTEMS, AND COMPUTER-READABLE MEDIUMS FOR INDEXING AND RAPIDLY SEARCHING DATA RECORDS

(75) Inventors: Douglas Van Natter, Birmingham, AL (US); Ronald Proctor, Birmingham, AL (US); Mitchell McIntosh, Ellicott City, MD (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 10/980,590

(22) Filed: Nov. 3, 2004

(51) Int. Cl.
*H04M 15/00* (2006.01)
(52) U.S. Cl. .................................... 379/126
(58) Field of Classification Search ............... 379/126, 379/127.01, 124, 121.04, 121.01, 127.02, 379/127.03, 127.04
See application file for complete search history.

(56) References Cited

U.S. PATENT DOCUMENTS 5,325,290 A * 6/1994 Cauffman et al. ............ 705/34
5,680,611 A * 10/1997 Rail et al. .................... 707/101
6,658,099 B2 * 12/2003 Perkins, III ............ 379/112.01
2001/0056362 A1 * 12/2001 Hanagan et al. ................ 705/7
2005/0086062 A1 * 4/2005 Clark et al. .................... 705/1

* cited by examiner

*Primary Examiner*—Rexford Barnie
(74) *Attorney, Agent, or Firm*—Merchant & Gould, LLC

(57) ABSTRACT

One method involves receiving a search request that includes a date and phone number. A master index file is searched for the phone number. The master index file includes phone numbers associated with calls that occurred on the date in the search request. The master index file also includes the location of the first index record for the phone number in an index file. The index file includes an index record for each call record. Each index record includes a phone number from a call record and the location of the call record. In response to locating the phone number in the master index file, the index file is searched for each index record with the phone number. In response to locating an index record with the phone number, the call record associated with that index record is retrieved. A search result including each call record retrieved is returned.

20 Claims, 5 Drawing Sheets

| TYPE | CALLED | CALLING | DATE | TIME | DURATION | CALL TYPE | ANSWERED |
|------|--------|---------|------|------|----------|-----------|----------|
| T | 4043708265 | 2054032640 | 2004/09/07 | 17:34:45 EST | 1:12.1 | 006 | Y |
| T | 4042493973 | 2054032640 | 2004/09/08 | 17:34:45 EST | 0:31.8 | 006 | Y |
| T | 4043708265 | 2054032640 | 2004/09/09 | 17:34:45 EST | 0:39.9 | 006 | Y |
| O | 4043708265 | 2054032640 | 2004/09/09 | 17:34:45 EST | 9:45.7 | 001 | Y |
| O | 2054032640 | 2059919784 | 2004/09/013 | 17:34:45 CMT | 2:45.4 | 001 | Y |
| O | 2054032640 | 2059919784 | 2004/09/013 | 17:34:45 EST | 0:33.8 | 001 | N |
| T | 4043708265 | 2059919784 | 2004/09/013 | 17:34:45 EST | 0:12.5 | 006 | N |

METHODS, SYSTEMS, AND COMPUTER-READABLE MEDIUMS FOR INDEXING AND RAPIDLY SEARCHING DATA RECORDS

TECHNICAL FIELD

The present invention generally relates to rapidly searching data records and, more particularly, relates to methods, computer-readable mediums, and systems for indexing and rapidly searching for call records in a telecommunications database.

BACKGROUND

Telecommunications companies periodically receive requests for searching call records. The requests may come in the form of a court subpoena asking for call records for certain phone numbers on specified or a range of dates and/or times. Additionally, internal security departments for telecommunications companies may need to request call record searches to investigate internal security issues. Also, telecommunications billing departments may occasionally need to search call records to verify a bill or to correct a billing issue. Previous systems are slow at executing a search of this kind, typically taking as much as three days to complete a search. Because previous systems are so slow, the mainframe or billing system costs alone for previous systems to run searches such as those mentioned above can amount to millions of dollars per year.

Also, previous systems are limited by the call record history available for searching, a cost of the search, and/or the duration of the search. Some previous systems limit the call history searched due to cost and time constraints. For instance, the search may be limited to the past 60 days of call history. Thus, information prior to the 60-day mark is potentially lost without some special custom procedure for retrieving the data. There are parts of the data that may remain in various different systems for various lengths of time. Thus, some of the call record history can potentially be found. However, custom procedures to retrieve call records can be even more time consuming and costly than standard procedures.

Accordingly there is an unaddressed need in the industry to address the aforementioned deficiencies and inadequacies.

SUMMARY

In accordance with embodiments of the present invention, the above and other problems are solved by methods, systems, and computer-readable-mediums for indexing and rapidly searching data records. The present methods of searching for call records as disclosed in embodiments of the present invention are fast, inexpensive and scalable to larger data sets. One embodiment provides a computer-implemented method of indexing and rapidly searching for call records in a computing system. Each call record may include an originating phone number of a call, a terminating phone number, a billed phone number, a date the call occurred, a time the call occurred, a duration of the call, a calling party, a called party, and a switch that carried the call among other related parameters. The method involves receiving the call records and sorting the call records such that a call record for a call that occurred on a particular date is stored with all other call records for calls on that particular date.

The method further involves creating an index record for each phone number included in the call records where each index record includes a phone number and a location of the call record associated with the phone number. The index records are then sorted by phone number where all index records that include a same phone number associated with call records from the same date are stored together. Next, the index records associated with a particular date are merged into an index file associated with that particular date and a master index file associated with that particular date is created. The master index file includes each phone number included in the index file and a location of a first index record in that index file for each phone number included in the master index file.

Still further, the method involves reading a search request for a call record where the search request includes a date and a phone number associated with the call record requested. Then the master index file is searched for the phone number in the search request where the master index file searched is associated with the date included in the search request. In response to locating the phone number in the master index file, the first index record for the phone number included in the search request is located in the index file and read. Then, in response to reading the first index record for the phone number included in the search request, the call record associated with the first index record for the phone number is located and retrieved.

Subsequently, a next index record in the index file is read. In response to the next index record including the phone number in the search request, the call record associated with the next index record is located and retrieved. Each next index record is read and the associated call record is retrieved until the next index record no longer includes the phone number in the search request. Then a search result including each call record retrieved is returned.

Another embodiment is a method of rapidly searching for a call record. The method involves receiving a search request that includes a date and a phone number associated with the call record requested. A master index file associated with the date is searched for the phone number included in the search request. The master index file includes phone numbers associated with calls that occurred on the date in the search request. Each phone number in the master index file is associated with at least one call record available for retrieval. The master index file also includes a pointer for each phone number included in the master index file. The pointers indicate a location of a first index record for the phone number in an index file associated with the date in the search request and the master index file. The index file includes at least one index record for each call record available for retrieval and each index record includes a phone number that is also included in a call record available for retrieval and a pointer indicating a location of the call record.

In response to locating the phone number included in the search request in the master index file, the index file is searched for each index record associated with the phone number included in the search request. Further, in response to locating an index record associated with the phone number in the search request, the call record associated with that index record is located and retrieved. Finally, a search result including each call record retrieved is returned.

Still another embodiment of the present invention is a system for indexing and rapidly searching for call records. The system includes a first computer operative to receive the call records and sort the call records. A call record for a call that occurred on a particular date is stored with all other call records for calls occurring on that particular date. The first computer is further operative to create an index record for each phone number in the call records where each index record includes a phone number and a location of the call record associated with the phone number. The first computer then sorts the index records by phone number where all index records that include a same phone number associated with call records from the same date are stored adjacent to one another. The index records associated with a particular date are then merged into an index file associated with that particular date and a master index file associated with that particular date is created. The master index file includes each phone number included in the index file and a location of a first index record in that index file for each phone number included in the master index file.

The first computer is still further operative to read a search request for a call record. The search request includes a date and a phone number associated with the call record requested. The first computer then searches the master index file for the phone number in the search request where the master index file searched is associated with the date included in the search request. In response to locating the phone number in the master index file, the first computer is operative to locate in the index file and read each index record for the phone number included in the search request. Further, in response to the phone number in an index record matching the phone number in the search request, the first computer is operative to retrieve the call record associated with that index record and return a search result that includes each call record retrieved.

The system may also include a second computer operative to receive, store, and/or forward the search request to a variety of computers including the first computer and receive, store, and/or forward the search result returned by the first computer. The system may still further include a third computer operative to prepare the call records received by the first computer where the first computer is further operative to query the third computer for the call records.

Aspects of the invention may be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION

As described briefly above, embodiments of the present invention provide methods, systems, and computer-readable mediums indexing and rapidly searching for call records. In the following detailed description, references are made to accompanying drawings that form a part hereof, and in which are shown by way of illustration specific embodiments or examples. These illustrative embodiments may be combined, other embodiments may be utilized, and structural changes may be made without departing from the spirit and scope of the present invention. The following detailed description is, therefore, not to be taken in a limiting sense, and the scope of the present invention is defined by the appended claims and their equivalents.

Figure 1:
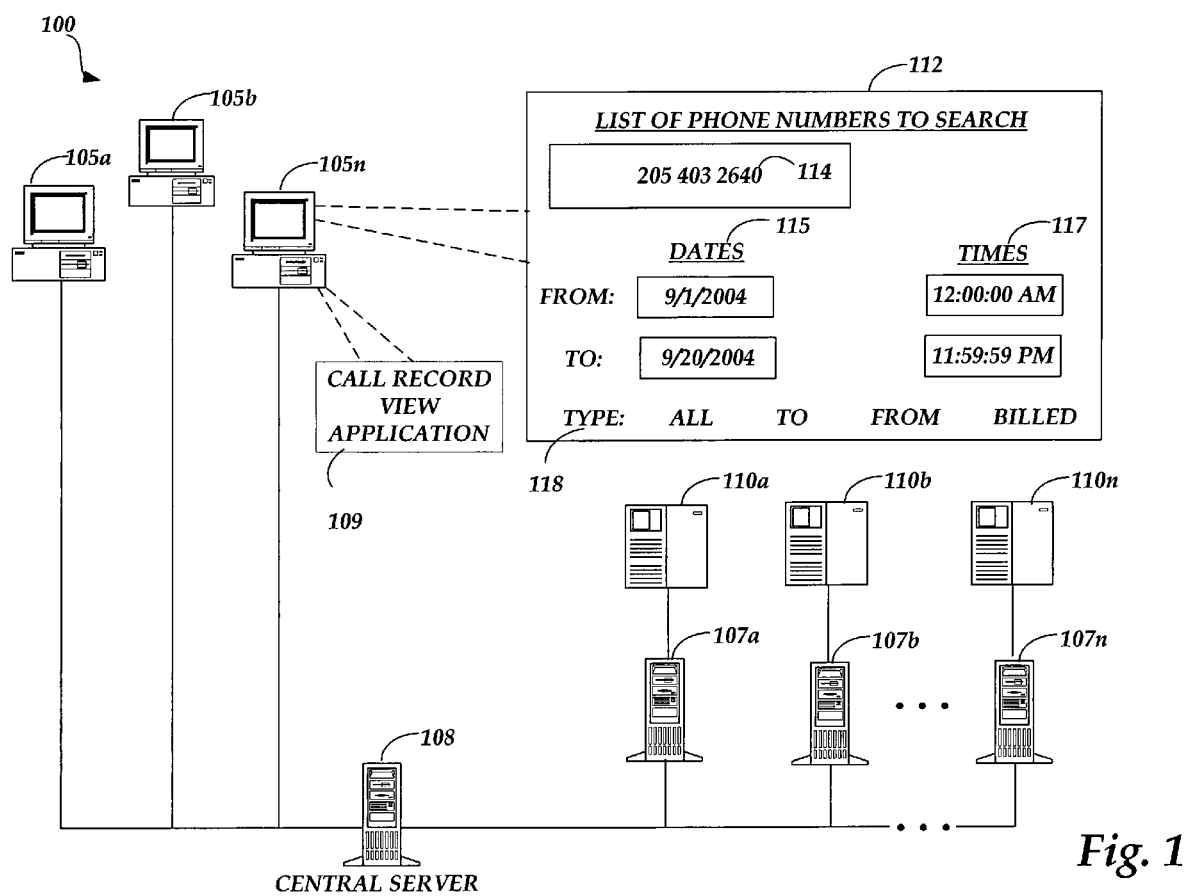
FIG. 1 is a schematic diagram illustrating aspects of a personal computer (PC), server, and billing system network utilized in an illustrative embodiment of the invention.
Figure 2:
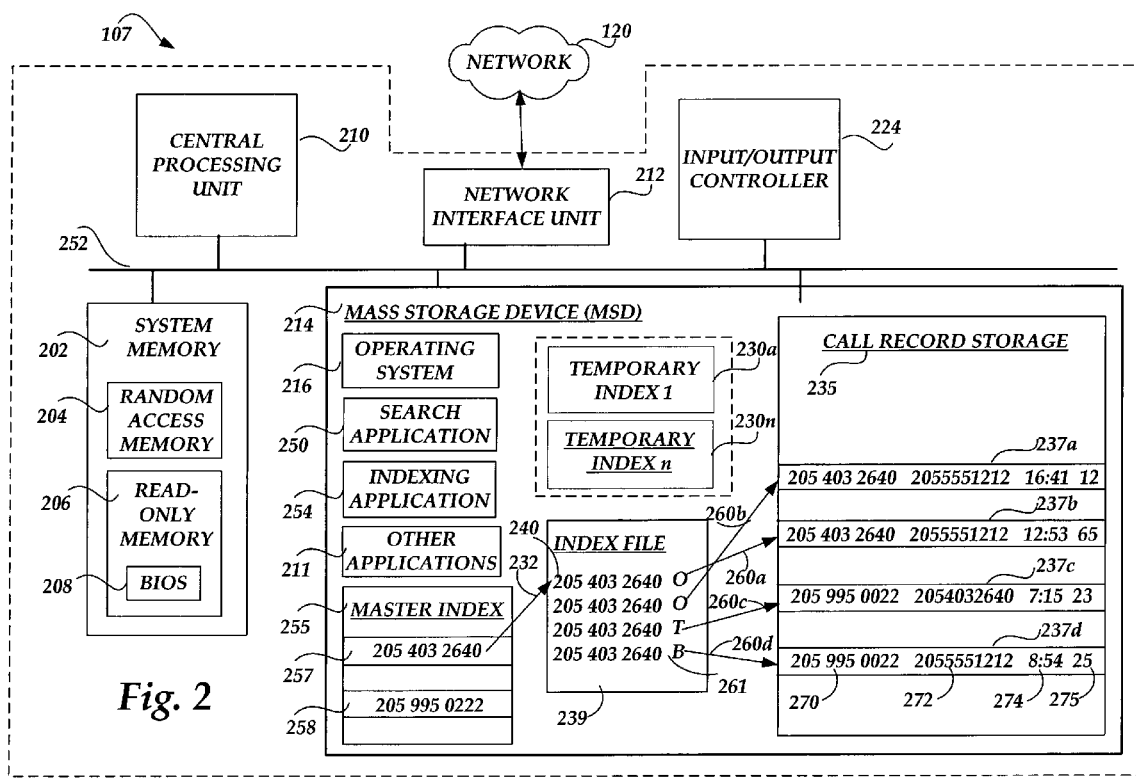
FIG. 2 illustrates computing system architecture for a search server computer utilized in an illustrative embodiment of the invention.

Referring now to the drawings, in which like numerals represent like elements through the several figures, aspects of the present invention and the illustrative operating environment will be described. FIGS. 1–2 and the following discussion are intended to provide a brief, general description of a suitable computing environment in which the embodiments of the invention may be implemented. While the invention will be described in the general context of program modules that execute in conjunction with a BIOS program that executes on a personal or server computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, a schematic diagram illustrating aspects of a personal computer (PC), server, and billing system network 100 utilized in an illustrative embodiment of the invention will be described. As shown in FIG. 1, the network 100 includes PCs 105a–105n, a central server 108, search servers 107a–107n, and billing systems 110a–110n. Each PC 105a–105n is a client PC of the central server 108 and includes a call record view application 109. The call record view applications provide a vehicle to receive search requests from users via a search interface, for example a search interface 112, and to display retrieved search results. The call record view application 109 is the subject of patent application Ser. No. 10/094,640, entitled System and Method for Managing CDR Information filed on Mar. 12, 2002, which is hereby incorporated by reference.

The search interface 112 includes a variety of fields for receiving parameters related to searching for call records. For example, the interface 112 includes a phone number field 114 for receiving one or more phone numbers for which call records are sought, a date field 115 for receiving a date or date range of calls associated with the call records searched, and a time field 117 for receiving a time or time range of the calls. The search interface 112 also may include a type field 118 designating whether a phone number sought is of all types, an originating phone number of a call, a terminating phone number, and/or a billed phone number.

The central server 108 receives search requests from the client PCs 105 and forwards the search requests to each search server 107a–107n. Each server 107a–107n downloads call record data from a respective billing system 110a–110n each day. The billing systems 110a–110n are regional, and thus capture call records for that region. Therefore, parallel searching of each region may take place for each search request. Parallel searching enables smaller groups of records to be searched simultaneously, which permits the search to go faster than trying to search all the data at a single location at once or consecutively. Furthermore, the searching takes place on the search servers 107a–107n and thus, does not require extensive billing system resources or time.

FIG. 2 illustrates a computing system architecture for a search server 107 utilized in an illustrative embodiment of the invention. The search server 107 includes a central processing unit (CPU) 210, a system memory 202, and a system bus 252 that couples the system memory 202 to the CPU 210. The system memory 202 includes read-only memory (ROM) 206 and random access memory (RAM) 204. A basic input/output system 208 (BIOS), containing the basic routines that help to transfer information between elements within the search server 107, such as during start-up, is stored in ROM 206. The search server 107 further includes a mass storage device (MSD) 214 for storing an operating system 216 such as WINDOWS XP, from MICROSOFT CORPORATION of Redmond, Wash., a search application 250 for searching data records, an indexing application 254 for indexing data, and other applications 211, for example a word processing and/or spreadsheet application. It should be appreciated that the MSD 214 may be a redundant array of inexpensive discs (RAID) system for storing data including software capable of supporting a TCP/IP or other protocol stack.

The indexing application 254 indexes the call records downloaded to call record storage 235, for example call records 237a–237d. Indexing of the call records produces temporary indexes 230a–230n, which are merged to create an index file 239 including index records 240, and a master index file 255 that includes master index records. Additional details regarding the indexing of call records will be describe below with respect to FIG. 3.

The MSD 214 is connected to the CPU 210 through a mass storage controller (not shown) connected to the system bus 252. The MSD 214 and its associated computer-readable media, provide non-volatile storage for the search server 107. Although the description of computer-readable media contained herein refers to a mass storage device, such as a hard disk or RAID array, it should be appreciated by those skilled in the art that computer-readable media can be any available media that can be accessed by the CPU 210.

An input/output controller 224 may also be included with the search server 107 for receiving and processing input from a number of input devices (not shown). The input/output controller 224 communicates with the CPU 210 through the system bus 252.

The CPU 210 may employ various operations, discussed in more detail below with reference to FIGS. 3 and 4 to provide and utilize the signals propagated between the search server 107 and the billing system 110. The CPU 210 may store data to and access data from mass storage device 214, such as electronic memory. Data is transferred to and received from the storage device 214 through the system bus 252. The CPU 210 may be a general-purpose computer processor. Furthermore as mentioned below, the CPU 210, in addition to being a general-purpose programmable processor, may be firmware, hard-wired logic, analog circuitry, other special purpose circuitry, or any combination thereof.

According to various embodiments of the invention, the search server 107 operates in a networked environment, as shown in FIGS. 1 and 2, using logical connections to remote computing devices via network communication, such as an Intranet, or a local area network (LAN). The search server 107 may connect to a network 120 via a network interface unit 212. It should be appreciated that the network interface unit 212 may also be utilized to connect to other types of networks and remote computer systems.

A computing system, such as the search server 107, typically includes at least some form of computer-readable media. Computer readable media can be any available media that can be accessed by the search server 107. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, disk drives, a collection of disk drives, flash memory, other memory technology or any other medium that can be used to store the desired information and that can be accessed by the search server 107.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer- readable media may also be referred to as computer program product.

Figure 3:
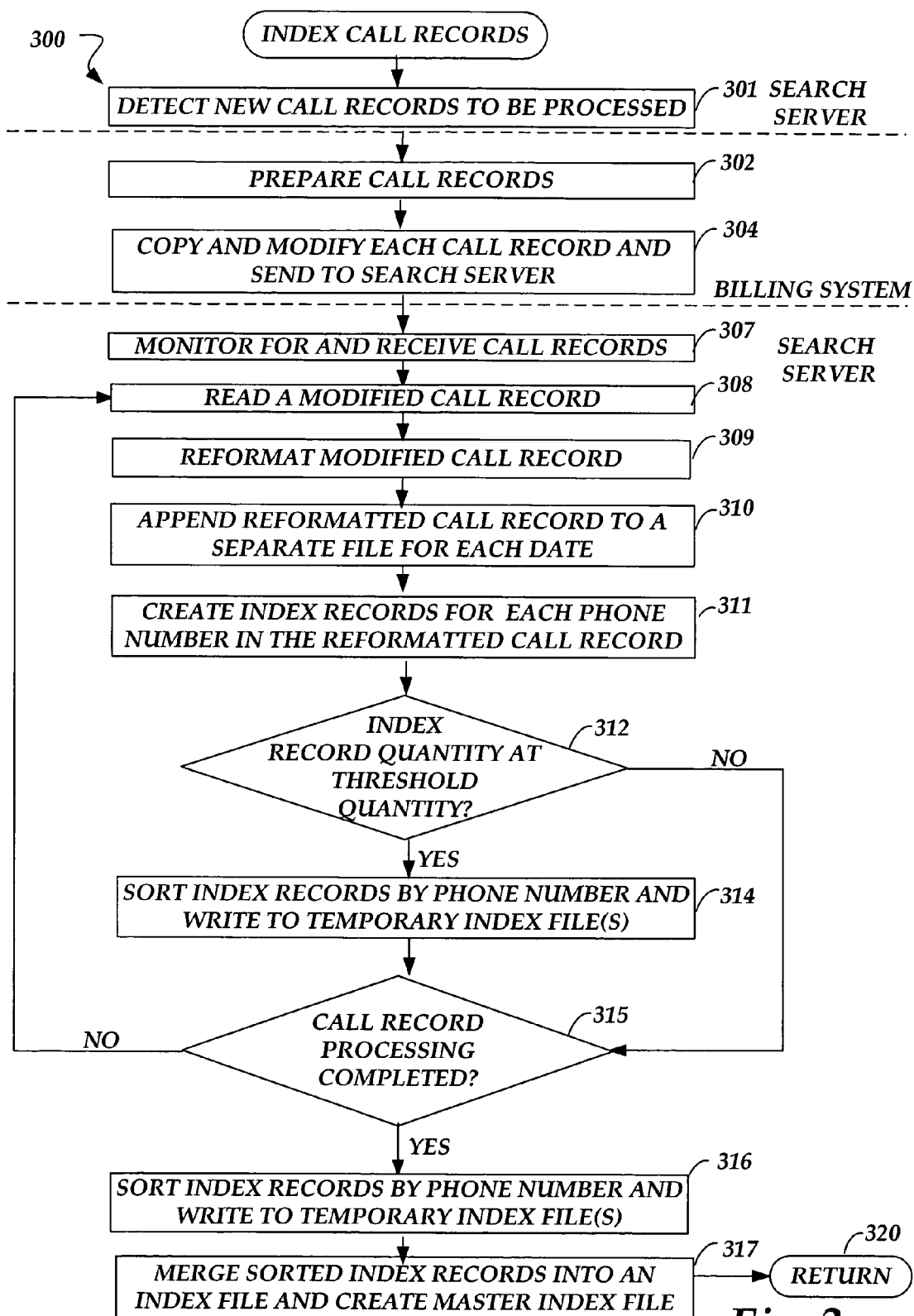
FIG. 3 illustrates an operational flow performed in indexing call records according to an illustrative embodiment of the invention.

Referring now to FIGS. 1, 2, and 3 an operational flow 300 performed in indexing call records according to an illustrative embodiment of the invention will be described. The operational flow 300 begins at operation 301 where the search server 107 monitors the billing system 110 and detects new data or call records available for processing. Next at operation 302 the billing systems 110a–110n prepare their respective call records that contain details of calls transacted over a telecommunications network. The call records are typically generated by a switch and transferred to a call detail record (CDR) collector before being sent to the billing system 110. Each call record may include an originating phone number of a call, a terminating phone number, a billed phone number, a date the call occurred, a time the call occurred, a duration of the call, a calling party name, a called party name, call type, carrier identifier, and/or a switch that carried the call among other parameters.

The operational flow continues to operation 304 where the billing system 110 copies and modifies the call records to exclude data unnecessary in locating the call record and sends the modified call records to the search server 107. This may include removing headers, trailers, and some summary information. This may also include removing unnecessary fields such as switch type and trunk usage information. Next, the operational flow 300 continues to operation 307 where the search server 107 monitors for and receives the modified call records by querying the billing system 110 for new call records and downloading the new call records. It should be appreciated that the search server may also retrieve the call records directly from a CDR collector (not shown) and/or a Voice over IP system (not shown).

The operational flow 300 then continues to operation 308 where the search server reads a modified call record. Next, at operation 309 the search server 107 reduces the modified call record in size by reformatting the call record to exclude information such as the date. The search server 107 stores the call records by date, which allows for faster searching. Storing the call records by date makes the date information within the call record unnecessary, thus removing the date information from the call record allows for smaller files. At operation 310, the search server 107 appends the reformatted call record to the call record storage file 235 for each date according to the date calls associated with the respective call record occurred. The search server 107 stores a call record for a call that occurred on a particular date with all other call records for calls on that particular date.

At operation 311, the search server 107 creates index records 261 for each phone number included in the reformatted call record storage files 235. The search server 107 converts the phone numbers included in the reformatted call records storage files 235 to a key or hash. The search server 107 may store these index records in the temporary index files 230*a*–230*n* until the downloaded call records are processed. Each index record includes a phone number 240 and a location or address 260*a*–260*d* of the call record associated with the phone number in the call record storage file 235. Typically there are two index records generated for each call record, one for the originating number and one for the terminating number. In some cases the originating number (or rarely the terminating number) is unknown. When this happens only a single index record is created. If the billed number is known and is different than both the originating number and the terminating number, an additional index record is created." If no valid numbers are found on the record, the record is not stored and no indexes are created.

At detect operation 312, the search server 107 makes a determination as to whether a quantity of index records created have reached a predetermined threshold quantity, for example 4 million. If not, the operational flow branches to detect operation 315 described below. When the quantity of index records has reached the predetermined threshold quantity, the operational flow continues to operation 314 where the search server 107 sorts the index records by phone number such that all index records that include a same phone number associated with call records from the same date are stored together.

The operational flow 300 then continues to detect operation 315 where a determination is made as to whether the all the new call records have been received and processed. If not, the operational flow 300 branches back to operation 307 described above. When the new call records have been received and processed, the operational flow 300 continues from detect operation 315 to operation 316 where any remaining index records are sorted and written out in a manner similar to operation 314. After all index records are written, the flow continues at merge operation 317 where the search server 107 merges index records associated with a particular date into the index file 239 associated with that particular date. Operation 317 also creates a master index file 255 associated with that particular date. The master index file includes each phone number 257 included in the index file 239 and a location or address 232 of a first index record 240 in that index file 239 for each phone number included in the master index file 255. The search server 107 creates index records, index files, and master index files for each date where calls associated with the stored call records occur. The operational flow 300 then returns control to other operations at return operation 320. It should be appreciated that the file of modified call records received at operation 307 are deleted after operation 317.

Figure 4:
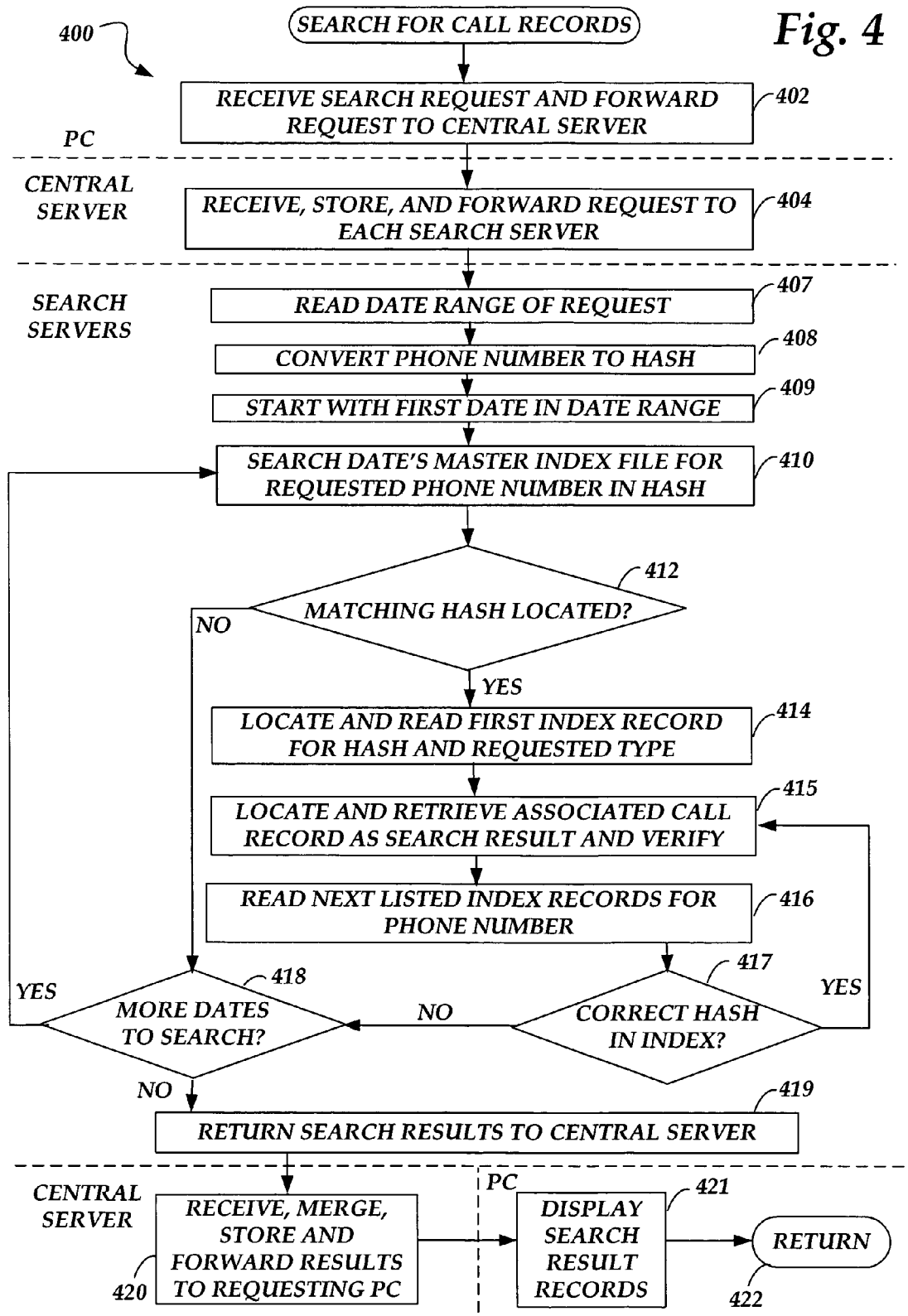
FIG. 4 illustrates an operational flow performed in searching data records for call records according to an illustrative embodiment of the invention.

Turning now to FIGS. 1, 2, and 4, an operational flow 400 performed in searching data records for call records according to an illustrative embodiment of the invention will be described. The operational flow 400 begins operation 402 where a search request is received at a client PC 105 and forwarded to the central server 108. In the present illustrative embodiment, the PC 105 may receive a list of phone numbers to search for, but the PC 105 forwards each phone number to the central server 108 as separate request. At operation 404 the central server 108 may receive, store, and forward the search request to each search server 107*a*–107*n*.

The operational flow 400 then continues to operation 407 where the search server 107 reads the search request for one or more call records. The search request at least includes a date range and phone number associated with the call records requested. Next, at operation 408, the search server 107 converts the phone numbers received in the search request to a key or hash. This conversion operation is identical to the conversion operation executed in operation 311 of FIG. 3. Next, at operation 409 the search server 107 begins with the first date of the date range and continues to operation 410. At operation 410, the search server 107 searches the master index file 255 for the hash of the phone number in the search request. The master index file 255 is associated with the date included in the search request.

The operational flow 400 then continues to detect operation 412 where the search server 107 makes a determination as to whether the hash representing the phone number of the search request is located in the master index file 255 for the date of the search request. If not, the operational flow 400 continues to operation 418 described below. When the hash of the phone number of the search request is included in the master index file 255, the operational flow 400 continues to operation 414. At operation 414, in response to locating hash of the phone number in the master index file 255, the search server 107 locates the index file 239 associated with the master index file and locates and reads the first index record for the hash of the phone number included in the search request.

Next at operation 415, in response to reading the first index record for the phone number included in the search request, the search server 107 locates and retrieves the call record associated with the first index record for the phone number. It should also be appreciated that because of the possibility of the same hash generated by two or more different phone numbers in a computer system, the search server 107 verifies that the phone numbers in the call records retrieved actually match the search request phone number. The operational flow 400 then continues to operation 416 where the search server 107 reads the next index records including the phone number in the search request. It should be appreciated that the index records may also be matched for type of phone number when type is included in the search request.

At operation 417, the search server 107 determines whether the next index record includes the correct hash or key matching the search request. When the correct hash is included, the operational flow 400 returns to operation 415 described above. Matching the search request may include matching all parameters in the search request including a time of the call, duration, and switch if included.

When the correct hash is not included, the operational flow 400 continues to operation 418 where the search server 107 determines whether there are more dates from the search request to search. When there are more dates to search, the operational flow 400 returns to operation 410 described above. When there are no more dates to search, the operational flow 400 continues to operation 419. At operation 419, the search server 107 returns the search results to the central server 108 having retrieved all the call records matching the search request.

At operation 420, the central server 108 receives, merges, stores, and forwards the search results to the requesting client PC 105. Then at operation 421 the requesting client PC 105 displays the search result call records as illustrated below in FIG. 5.

Figure 5:
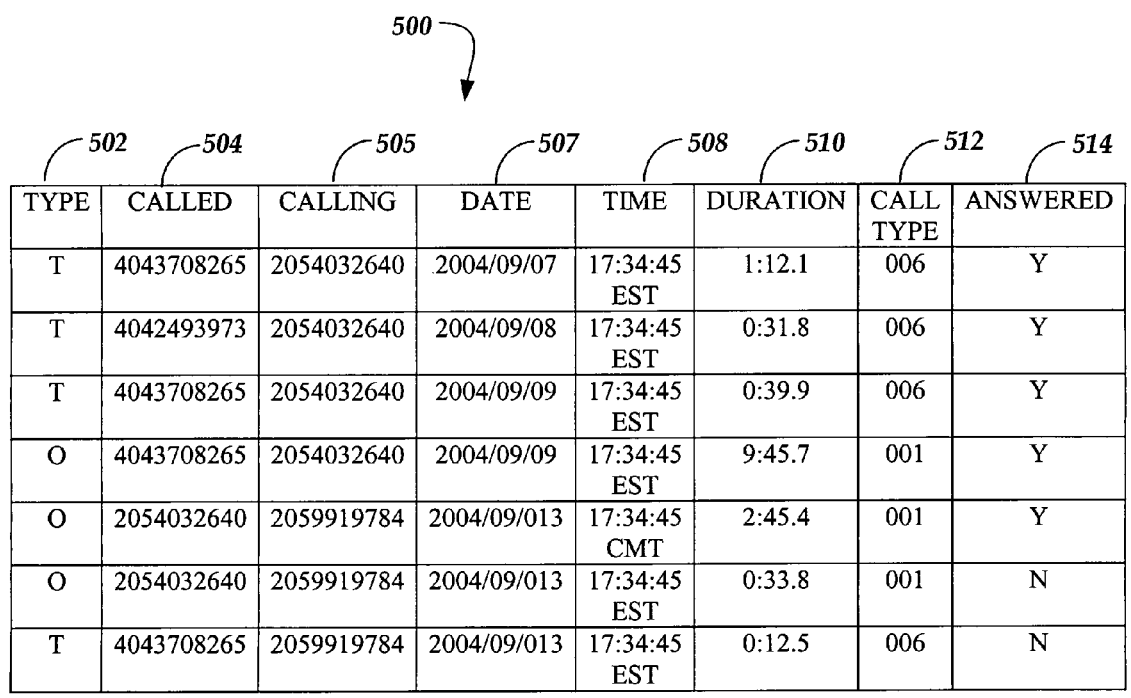
FIG. 5 is an interface display of a search result utilized in an illustrative embodiment of the invention.

FIG. 5 is an interface display 500 of a search result utilized in an illustrative embodiment of the invention. The interface display 500, displayed via the client PC 105, may include the type 502 of search request phone number, the called phoned number 504, the calling phone number 505, the date of the call 507, time of the call 508, duration of the call 510, a call type 512, and an indicator 514 as to whether the call was answered as well as other call record parameters.

Thus, the present invention is presently embodied as methods, systems, computer program products or computer readable mediums encoding computer programs for indexing and rapidly searching for call records in a computing system.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer implemented method of indexing and rapidly searching for call records in a computing system wherein each call record includes at least one of an originating phone number of a call, a terminating phone number, a billed phone number, a date the call occurred, a time the call occurred, a duration of the call, a calling party name, a called party name, and a switch that carried the call, the method comprising:

receiving the call records;

storing the call records wherein a call record for a call that occurred on a particular date is stored with all other call records for calls on that particular date;

creating an index record for each phone number in the call records wherein each index record includes a phone number and a location of the call record associated with the phone number included;

sorting the index records by phone number wherein all index records that include a same phone number associated with call records from the same date are stored together;

merging the index records associated with a particular date into an index file associated with that particular date; and creating a master index file associated with that particular date the master index file including each phone number included in the index file and a location of a first index record in that index file for each phone number included in the master index file.

2. The method of claim 1, further comprising:

reading a search request for a call record wherein the search request includes a date and a phone number associated with the call record requested;

searching the master index file for the phone number in the search request wherein the master index file searched is associated with the date included in the search request; and in response to locating the phone number in the master index file, locating in the index file and reading the first index record for the phone number included in the search request.

3. The method of claim 2, further comprising in response to reading in the index file the first index record for the phone number included in the search request, locating and retrieving the call record associated with the first index record for the phone number.

4. The method of claim 3, further comprising:

a) reading a next index record in the index file;

b) in response to the next index record including the phone number in the search request, locating and retrieving the call record associated with the next index record; and repeating a) and b) until the next index record no longer includes the phone number in the search request.

5. The method of claim 4, further comprising returning a search result wherein the search result includes each call record retrieved.

6. The method of claim 4, further comprising:

verifying whether each call record retrieved is actually a call record for the phone number in the search request; and in response to a call record retrieved being actually for the phone number in the search request, returning a search result that includes that call record retrieved.

7. The method of claim 2, wherein the search request further includes a type of phone number requested comprising at least one of all types, originating, terminating, and billed and wherein each index record further includes a flag indicating whether the phone number in the index record is at least one of originating, terminating, and billed further comprising in response to the phone number in the first index record being the type of phone number requested, locating and retrieving the call record associated with the first index record for the phone number in the search request.

8. The method of claim 7, further comprising:

reading each index record in the index file that includes the phone number in the search request and is subsequent to the first index record;

in response to the phone number in an index record read matching the phone number in the search request and being the type of phone number requested, retrieving the call record associated with that index record; and returning a search result wherein the search result includes each call record retrieved.

9. The method of claim 2, wherein the search request further includes a time associated with the call record requested, the method further comprising:

in response to reading the first index record for the phone number in the index file, locating and reading the call record associated with the first index record for the phone number in the search request;

determining whether the call record read is associated with the time associated with the call record requested;

in response to the call record read being associated with the time, retrieving the call record read;

reading each subsequent index record in the index file containing the phone number in the search request;

in response to the phone number in an index record matching the phone number in the search request, reading the call record associated with that index record;

in response to the call record associated with that index record being associated with the time, retrieving the call record associated with that index record; and returning a search result wherein the search result includes each call record retrieved.

10. The method of claim 1, wherein receiving the call records comprises receiving modified call records that exclude fields that are unnecessary for indexing and rapidly searching for call records.

11. The method of claim 1, further comprising reducing a size of the call records received.

12. The method of claim 11, wherein reducing the size of the call records received comprises reformatting the call records to exclude the date the call occurred and to compress data stored in the call records received.

13. The method of claim 1, wherein creating an index record for each phone number in the call records includes:

determining whether the billed phone number for a call record matches at least one of the originating phone number and the terminating phone number for the call record; and creating an index record for the billed phone number only when the billed phone number does not match at least one of the originating phone number and the terminating phone number for the call record.

14. The method of claim 1, wherein receiving the call records comprises reading the call records from a file, the method further comprising:

determining whether a quantity of the index records created has reached a predetermined quantity wherein the index records are sorted into a first temporary index file in response to the quantity of index records created reaching the predetermined quantity;

accumulating additional index records created in a second temporary index file until the predetermined quantity is reached;

when the predetermined quantity is reached, sorting the additional index records in the second temporary index file; and determining whether reading the call records from the file has been completed wherein merging the index records associated with a particular date into an index file comprises merging the index records sorted from each temporary index file into the index file in response to reading the call records being completed.

15. The method of claim 1, wherein creating the master index file comprises creating the master index file simultaneously with the index file.

16. A computer program product comprising a computer-readable medium having control logic stored therein for causing a computer to index and rapidly search for call records in a computing system, the control logic comprising computer-readable program code for causing the computer to:

receive the call records;

store the call records wherein a call record for a call that occurred on a particular date is stored with all other call records for calls on that particular date;

create an index record for each phone number in the call records wherein each index record includes a phone number and a location of the call record associated with the phone number included;

sort the index records by phone number wherein all index records that include a same phone number associated with call records from the same date are stored together;

merge the index records associated with a particular date into an index file associated with that particular date; and create a master index file associated with that particular date the master index file including each phone number included in the index file and a location of a first index record in that index file for each phone number included in the master index file.

17. A method of rapidly searching for a call record, the method comprising:

receiving a search request that includes a date and a phone number associated with the call record requested;

searching a master index file associated with the date for the phone number included in the search request wherein the master index file includes:

phone numbers associated with calls that occurred on the date each phone number in the master index file being associated with at least one call record available for retrieval; and a pointer for each phone number included in the master index file indicating a location of a first index record for the phone number in an index file associated with the date and the master index file, the index file including at least one index record for each call record available for retrieval wherein each index record includes a phone number included in a call record available for retrieval and a pointer indicating a location of the call record;

in response to locating the phone number included in the search request in the master index file, searching the index file for each index record associated with the phone number included in the search request;

in response to locating an index record associated with the phone number included in the search request, locating and retrieving the call record associated with that index record; and returning a search result wherein the search result includes each call record retrieved.

18. A system for indexing and rapidly searching for call records wherein each call record includes at least one of an originating phone number of a call, a terminating phone number, a billed phone number, a date the call occurred, a time the call occurred, a duration of the call, a calling party name, a called party name, and a switch that carried the call, the system comprising:

a first computer operative to:

receive the call records;

sort the call records wherein a call record for a call that occurred on a particular date is stored with all other call records for calls on that particular date;

create an index record for each phone number in the call records wherein each index record includes a phone number and a location of the call record associated with the phone number included;

sort the index records by phone number wherein all index records that include a same phone number associated with call records from the same date are stored adjacent to one another;

merge the index records associated with a particular date into an index file associated with that particular date; and create a master index file associated with that particular date the master index file including each phone number included in the index file and a location of a first index record in that index file for each phone number included in the master index file.

19. The system of claim 18, wherein the first computer is further operative to:

read a search request for a call record wherein the search request includes a date and a phone number associated with the call record requested;

search the master index file for the phone number in the search request wherein the master index file searched is associated with the date included in the search request; and in response to locating the phone number in the master index file, locate in the index file and read each index record for the phone number included in the search request;

in response to the phone number in an index record read matching the phone number in the search request, retrieve the call record associated with that index record; and return a search result wherein the search result includes each call record retrieved.

20. The system of claim 19, further comprising:

a second computer operative to:

at least one of receive the search request, store the search request, and forward the search request to a variety of computers including the first computer; and at least one of receive, store, and forward the search result returned by the first computer; and a third computer operative to:

prepare the call records received at the first computer wherein the first computer is further operative to query the third computer for the call records.

\* \* \* \* \*